United States Patent [19]
Hill

[11] Patent Number: 5,670,774
[45] Date of Patent: Sep. 23, 1997

[54] PHOTOSENSOR TO DETECT THE DIRECTION OF INCIDENCE AND INTENSITY OF OPTICAL RADIATION

[75] Inventor: Jonathan W. Hill, Sebago Lake, Me.

[73] Assignee: Control Devices, Inc., Standish, Me.

[21] Appl. No.: 653,818

[22] Filed: May 28, 1996

Related U.S. Application Data

[63] Continuation of Ser. No. 377,906, Jan. 25, 1995, abandoned.

[51] Int. Cl.$^6$ ........................................................ G01J 1/20
[52] U.S. Cl. ........................ 250/203.4; 250/206.1; 126/573
[58] Field of Search .................. 250/203.4, 203.1, 250/203.3, 206.1, 206.2; 126/575, 573

[56] References Cited

U.S. PATENT DOCUMENTS

| | | |
|---|---|---|
| 3,064,131 | 11/1962 | Brown .................................... 250/203.4 |
| 3,293,440 | 12/1966 | Mueller . |
| 4,713,533 | 12/1987 | Bremer et al. ...................... 250/203 R |
| 5,117,744 | 6/1992 | Zimmer et al. ........................... 454/75 |
| 5,264,691 | 11/1993 | Hegyi ................................... 250/203.4 |
| 5,416,318 | 5/1995 | Hegyi ...................................... 250/226 |
| 5,444,234 | 8/1995 | Hennerici et al. ................... 250/206.2 |

*Primary Examiner*—Stephone Allen
*Attorney, Agent, or Firm*—Woodard, Emhardt, Naughton Moriarty & McNett

[57] ABSTRACT

A photosensor which is capable of detecting the direction of incidence as well as the intensity of optical radiation. The detector comprises an array of photodetector cells arranged under a diffuser dome. The direction of incidence of the optical radiation can be determined by a comparison of the voltage outputs of each of the photodetectors in the array, these outputs being directly proportional to the amount of optical radiation falling upon each photodetector in the array. The intensity of the optical radiation can be determined by an analysis of the average output of the photodetector array.

16 Claims, 1 Drawing Sheet ns # PHOTOSENSOR TO DETECT THE DIRECTION OF INCIDENCE AND INTENSITY OF OPTICAL RADIATION

This applicaiton is a continuation of application Ser. No. 08/377,906, filed Jan. 25, 1995, now abandoned.

TECHNICAL FIELD OF THE INVENTION

The present invention relates generally to photosensors and more particularly to photosensors to detect the direction of incidence and intensity of optical radiation.

BACKGROUND OF THE INVENTION

Of the numerous known systems for producing electrical signals having information content responsive to the relative orientation of a light source, most are complex and expensive, and have associated therewith electronic signal analysis systems which are bulky, thereby limiting their applicability in space-restricted environments, such as the interior of motor vehicles.

One known arrangement for determining the position of a source of incident radiation utilizes a pair of solar cells arranged in orthogonal relationship to one another. Thus, this system cannot be employed in applications requiring flatness or compactness of the sensor arrangement. The incident electromagnetic radiation, or sunlight, causes the orthogonally arranged radiation detectors to generate respective output electrical signals having amplitudes responsive to the angle of incidence of the light. Ratio-detecting circuitry is used to determine the angle of incidence with respect to the orientation of the solar detectors, by monitoring and comparing the output signals of the respective solar detectors.

A further known system for determining the direction of incident radiation utilizes a sensor head having a hemispherical convex surface area on which are terminated a plurality of optical fibers. The optical fibers are bundled and terminated at their distal ends with detectors, which are arrayed illustratively in the form of a matrix. This known system, however, in addition to requiring a multiplicity of detectors arranged in a matrix, also requires complex mathematical and evaluation circuitry which render this known system unsuitable in applications where simplicity and economy are required.

In vehicles which continually are changing their orientation with respect to the sun, it is desirable to modify the output of associated heating and cooling systems so as to take into consideration the effects of sunlight. In such systems, however, there is not often available space for a complex, multi-component sensor and its associated computation circuitry.

In order to address this problem, U.S. Pat. No. 5,264,691 to Hegyi discloses a plurality of photosensors having respective substantially planar light-sensitive surfaces which receive input light from a source of light. Each of the sensors has a respective output terminal for providing an output electrical signal which is responsive to the input light from the source of light. A light mask is arranged to overlie the substantially planar light-sensitive surfaces such that the mask casts a shadow on the sensors whenever the source of light is not directly overhead. By examining the outputs of the sensors, the position of the shadow (and therefore the position of the source of light) can be determined. This known device has the disadvantage that it requires rotational alignment of the mask with respect to the photosensors. Furthermore, this known device is accurate only to angles of incidence of up to about 75° from overhead and the height of the mask must be precisely controlled to obtain accurate light source positions at low angles of incidence.

There is therefore a need in the prior art for a photosensor which can detect the direction of incidence and intensity of optical radiation for light source angles of incidence of up to 90° from overhead. There is a further need for a photosensor device which does not require axial and rotational alignment of its parts during manufacture. The present invention is directed toward meeting these needs.

SUMMARY OF THE INVENTION

The present invention relates to a photosensor which is capable of detecting the direction of incidence as well as the intensity of optical radiation. The detector comprises an array of photodetector cells arranged under a diffuser dome. The direction of incidence of the optical radiation can be determined by a comparison of the voltage outputs of each of the photodetectors in the array, these outputs being directly proportional to the amount of optical radiation falling upon each photodetector in the array. The intensity of the optical radiation can be determined by an analysis of the average output of the photodetector array.

In one form of the invention a photosensor to detect direction of incidence and intensity of optical radiation is disclosed, comprising a plurality of photodetectors; and a diffuser substantially overlying the plurality of photodetectors; wherein the diffuser is substantially dome shaped and is operative to diffuse optical radiation.

In another form of the invention, a photosensor to detect direction of incidence and intensity of optical radiation is disclosed, comprising a substrate; a plurality of photodetectors mounted to the substrate; a plurality of output pins, each of said output pins corresponding to a respective one of the plurality of photodetectors and extending through the substrate; a diffuser coupled to the substrate, wherein the diffuser is substantially dome shaped and is operative to diffuse optical radiation.

In another form of the invention, a method of detecting the direction of incidence of optical radiation is disclosed, comprising the steps of: (a) causing the optical radiation to be diffused over a plurality of photodetectors; (b) reading an output signal from each of the plurality of photodetectors, wherein each output signal is proportional to an amount of optical flux incident on the respective photodetector; (c) determining the X and Y coordinates of a centroid of the diffused optical radiation from the photodetector output signals; (d) determining an altitude angle based on the centroid X and Y coordinates; and (e) determining an azimuthal angle based on the centroid X and Y coordinates.

DESCRIPTION OF THE PREFERRED EMBODIMENT

Figure 1:
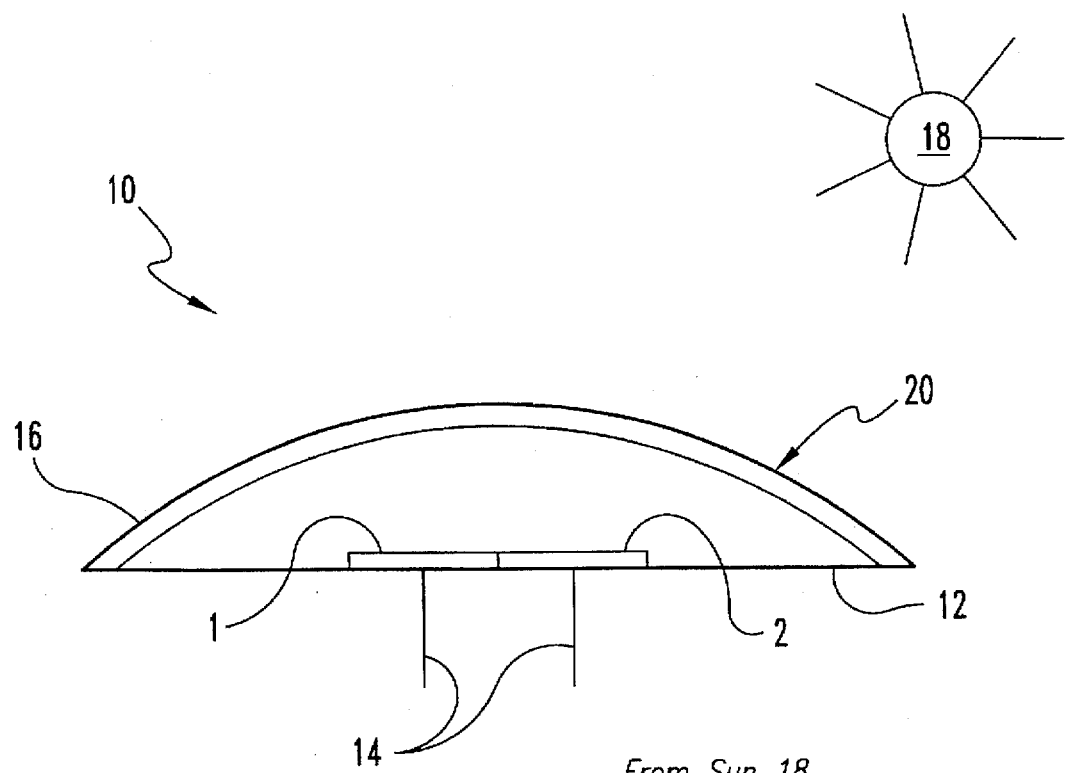
FIG. 1 is a cross-sectional view of a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is shown a preferred embodiment photosensor of the present invention in a cross-sectional view and indicated generally at 10. The photosensor is comprised of an array of photodetectors, of which photodetectors 1 and 2 are visible in this cross-sectional view. In a preferred embodiment, there are four such photodetectors 1–4 arranged in a square grid (see FIG. 2). The photodetectors 1–4 are mounted on a substrate 12 by any suitable means. Each of the photodetectors 1–4 includes a lead 14 which protrudes through the bottom of the substrate 12. The photodetectors 1–4 produce a voltage on their respective leads which is directly proportional to the amount of optical radiation received by the photodetector. The entire assembly is covered by a diffuser dome 16 which is also mounted to the substrate 12. The diffuser 16 is preferably made of Delrin plastic. A light source 18, such as the sun, irradiates the photosensor 10 with optical radiation. The brightest area of light falling on the diffuser 16 is indicated at 20. The photodetectors 1–4 which are nearest to the bright spot 20 will receive the greatest amount of incident optical radiation. Conversely, the photodetectors 1–4 which are farthest away from the bright spot 20 will receive the least amount of incident optical radiation. Motion of the sun 18 relative to the photosensor 10, which may result from the sun's motion across the sky or from the motion of the device itself, in situations where it is mounted on a vehicle (not shown), causes the bright spot 20 to move across the surface of the diffuser 16, thereby changing the relative amounts of incident optical radiation experienced by each of the photodetectors 1–4. Consequently, the relative amount of incident optical radiation falling on each photodetector 1–4 will be a function of the position of the sun relative to the photosensor 10, and accordingly, the voltage produced by each photodetector 1–4 will be a function of the position of the sun 18. Therefore, the position of the sun 18 can be accurately determined by taking ratios of the voltages between different photodetector elements, while the overall intensity of the solar flux can be determined by the actual voltages themselves, the solar position, and the light-to-voltage conversion efficiency of the photodetectors.

Figure 2:
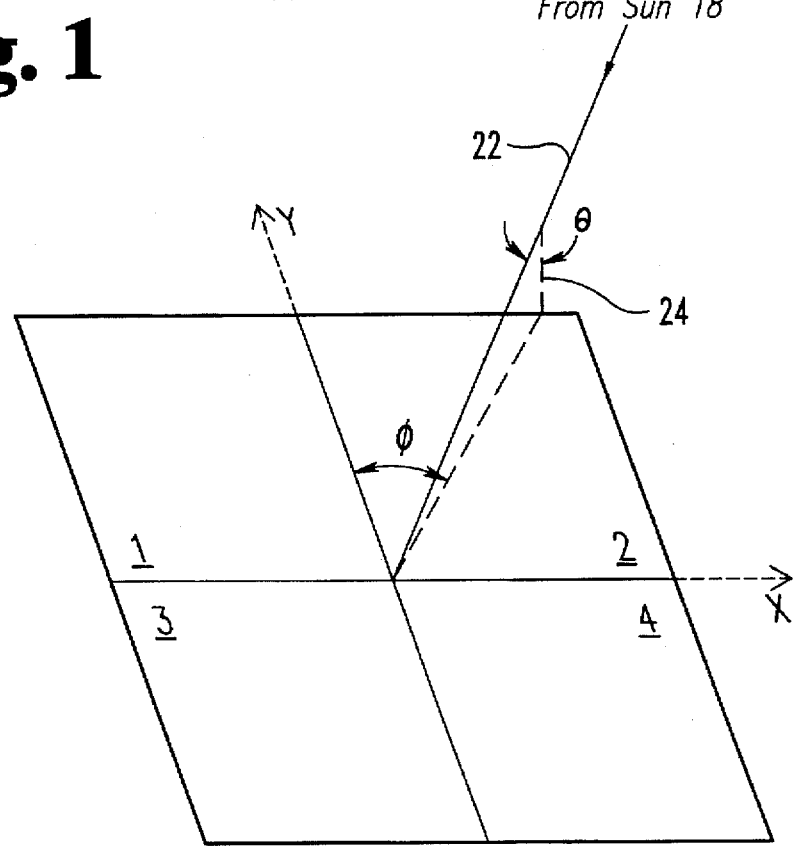
FIG. 2 is a perspective view of the photodetector array of the present invention.

Referring now to FIG. 2, the photodetector array is shown in perspective view and comprises photodetectors 1–4 arranged in a substantially square grid. Those skilled in the art will recognize that the present invention may be realized with any configuration for the photodetector grid. For purposes of calculating the position of the sun 18, reference axes X and Y are located such that the X axis falls directly between photodetectors 1 and 3 and between photodetectors 2 and 4, while the Y axis falls directly between photodetectors 1 and 2 and between photodetectors 3 and 4. The arrows on the X and Y axes indicate the direction of positive value. The position of the sun 18 can be described with respect to the photosensor 10 by an altitude angle $\theta$ and an azimuthal angle $\phi$. The altitude angle $\theta$ is defined as the angle between the incident ray 22 and a perpendicular line 24 between the incident ray 22 and the surface of the photodetector array. The azimuthal angle $\phi$ is measured from the Y axis toward the X axis, to a projection of the ray 22 in the X,Y plane.

The ratios of the voltages of the photodetector elements 1–4 are directly related to the amount of solar flux incident on the photodetector elements 1–4. Thus, the position of the sun 18, as well as the overall intensity of the solar flux, can be determined from an analysis of the voltages produced by the photodetectors 1–4. In operation, the voltage from each photodetector element 1–4 is first measured. The position of the centroid of the incident energy is first calculated. The X and Y coordinates of the centroid are given as follows:

$$X=((V2+V4)-(V1+V3))/(V1+V2+V3+V4)$$

$$Y=((V1+V2)-(V3+V4))/(V1+V2+V3+V4)$$

The coordinates of the centroid determine the projection of the bright spot 20 onto the photodetector array surface. Once the coordinates of the centroid have been determined, the altitude angle $\theta$ can be determined as follows:

$$\theta = K \times R$$

where

K=a constant $$R = \sqrt{X^2 + Y^2}$$

The constant K is experimentally determined for any given photosensor 10 design. The azimuthal angle $\phi$ is determined as follows:

$$\phi = \tan^{-1}(X/Y)$$

$\phi$ will always have a value between −90° and 90°. To find out which quadrant of the photodetector array $\phi$ is in requires a test of the signs of X and Y. For example, a positive X and a positive Y indicate that the value of $\phi$ lies in the quadrant of the photodetector 2, while a value of positive X and negative Y indicates that the angle $\phi$ lies in the quadrant of photodetector 4. If it is determined that the angle $\phi$ lies in the quadrant of photodetector 4, it is then necessary to add 90° to the calculated value of $\phi$. A similar correction is made if the angle $\phi$ is determined to lie within the quadrant of photodetector 3. A determination of the altitude angle $\theta$ and the azimuthal angle $\phi$ gives a complete definition of the direction of incidence of optical radiation coming from the sun 18.

As an illustrative example, assume that the position of the sun with respect to the photodetector array is generally as shown in FIG. 2. With the sun 18 in such a position, the voltages produced by each of the photodetectors would be similar to the following:

V1=9

V2=10

V3=7

V4=8

It will be appreciated by those skilled in the art that the voltages produced by the photodetector elements which are closest to the sun 18 are higher than the voltages produced by the photodetector elements which are further away. The centroid of the incident radiation is then calculated as follows:

$$X=((10+8)-(9+7))/(9+10+7+8)=0.0588$$

$$Y=((19+10)-(17+8))/(19+10+7+8)=0.1176$$

Knowing the centroid values, the altitude angle $\theta$ can be calculated as follows:

$$R = \sqrt{(.0588)^2 + (.1176)^2}$$
$$= .1315$$
$$\theta = .1315K$$

The final value of the altitude angle θ is determined by applying the appropriate constant K, which is determined experimentally for any particular photosensor 10 design. Finally, the azimuthal angle φ is determined as follows:

$$\phi = \tan^{-1}(.0588/.1176)$$
$$= 26.6°$$

Because the signs of both X and Y are positive, the azimuthal angle φ lies in the quadrant of photodetector 2, and no further correction is required (i.e. the actual value of φ=26.6°).

The additional parameter which is essential to a complete description of the solar radiation is the solar flux. It is understood that, given the conversion efficiency between photodetector voltage and incident flux striking the photodetector perpendicular to the plane of the detector, a measured photodetector voltage can be used to obtain the solar flux at perpendicular incidence. However, at angles of incident other than perpendicular to the detector, determination of the flux of the sun 18 is more complicated. In such non-perpendicular arrangements, the angle at which the solar flux strikes the photodetector must be considered. The angle between the perpendicular to the photodetector surface and the direction of the solar radiation is the same angle θ which was discussed hereinabove. Initially, one might expect that the measured solar flux is produced by the projection factor of the area of the photodetector as seen from the position of the sun 18. This would lead to the photodetector current being reduced by a factor of cosine θ relative to solar radiation at an angle of incidence θ not equal to 0. However, the reflectivity of the photodetector surface is also a function of θ and must be taken into consideration, particularly for silicon detectors, since the reflectivity is not small and is a function of θ. An alternative to calculating the reflectivity as a function of θ is to perform a simple calibration. By tipping the photodetector relative to the direction of incident sunlight to cover the range of angles of incidence of interest and measuring the photodetector voltage, a calibration which takes into consideration all of the appropriate factors can easily be empirically determined.

As previously stated, the diffuser dome 16 is placed over the photodetector array in order to diffuse light across the surface of the photodetectors. The shape of the diffuser 16 is a determining factor in the accuracy of the photosensor 10. It is desirable that the shape of the diffuser 16 allow for a linear relationship between the altitude angle θ and the value of R, as evidenced by the equation θ=K×R. It has been found experimentally that a constant radius dome 16 comes closest to fulfilling this relationship. The optimum diffuser 16 shape is believed to be a complete semisphere (i.e. one-half of a sphere), but space considerations often demand that the diffuser 16 occupy less volume. Experimental results indicate that a smaller section of a constant radius sphere will produce good results when used as the diffuser 16. Generally, the surface area of the diffuser 16 should be greater than the surface area of the photodetector dies.

The processing circuitry required to translate between the photodetector voltages and the values of θ, φ, and total solar flux, can be implemented in a variety of ways, as will be readily apparent to those skilled in the art. For example, it might be convenient to store the solar flux correction factors as a function of angle of incidence in a look-up table using data which has been experimentally determined as described above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A photosensor to detect direction of incidence and intensity of optical radiation, comprising:

a plurality of photodetectors, said photodetectors lying in a substantially flat plane; and a diffuser substantially overlying the plurality of photodetectors;

wherein the diffuser is substantially dome shaped and is operative to diffuse optical radiation; and wherein no portion of the photosensor causes a shadow to be cast on the plurality of photodetectors when the direction of incidence is within a measurable range of the photosensor.

2. The photosensor of claim 1, wherein the diffuser is a hollow semisphere.

3. The photosensor of claim 1, wherein the diffuser is a hollow spherical section.

4. The photosensor of claim 1, wherein an external surface area of the diffuser is greater than a total surface area of the plurality of photodetectors.

5. The photosensor of claim 1, wherein the diffuser has a substantially constant radius.

6. The photosensor of claim 1, further comprising a substrate for mounting the plurality of photodetectors and the diffuser.

7. The photosensor of claim 1, wherein the plurality of photodetectors are arranged in a grid pattern.

8. A photosensor to detect direction of incidence and intensity of optical radiation, comprising:

a substrate;

a plurality of photodetectors mounted to the substrate, said photodetectors lying in a substantially flat plane;

a plurality of output pins, each of said output pins corresponding to a respective one of the plurality of photodetectors and extending through the substrate; and a diffuser coupled to the substrate, wherein the diffuser is substantially dome shaped and is operative to diffuse optical radiation;

wherein no portion of the photosensor causes a shadow to be cast on the plurality of photodetectors when the direction of incidence is within a measurable range of the photosensor.

9. The photosensor of claim 8, wherein the diffuser is a hollow semisphere.

10. The photosensor of claim 8, wherein the diffuser is a hollow spherical section.

11. The photosensor of claim 8, wherein an external surface area of the diffuser is greater than a total surface area of the plurality of photodetectors.

12. The photosensor of claim 8, wherein the diffuser has a substantially constant radius.

13. The photosensor of claim 8, wherein the plurality of photodetectors are arranged in a grid pattern.

14. A method of detecting the direction of incidence of optical radiation, comprising the steps of:

(a) causing the optical radiation to be diffused over a plurality of photodetectors;

(b) reading an output signal from each of the plurality of photodetectors, wherein each output signal is proportional to an amount of optical flux incident on the respective photodetector;

(c) determining the X and Y coordinates of a centroid of the diffused optical radiation from the photodetector output signals;

(d) determining an altitude angle based on the centroid X and Y coordinates; and (e) determining an azimuthal angle based on the centroid X and Y coordinates.

15. The method of claim 14, wherein the altitude angle is determined by multiplying a predetermined constant by a square root of $(X^2+Y^2)$.

16. The method of claim 14, wherein the azimuthal angle is determined by taking an inverse tangent of $(X/Y)$.

* * * * *